Feb. 20, 1923.
J. A. PAYETTE
1,446,207
MACHINE FOR AND METHOD OF MAKING CHAIN
Filed Sept. 7, 1921    6 sheets-sheet 6
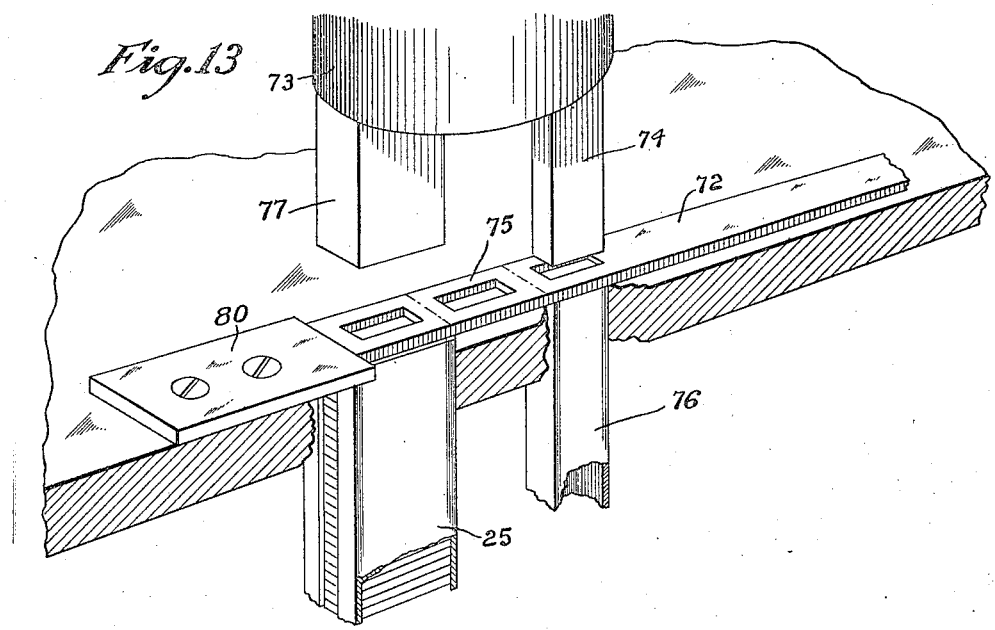
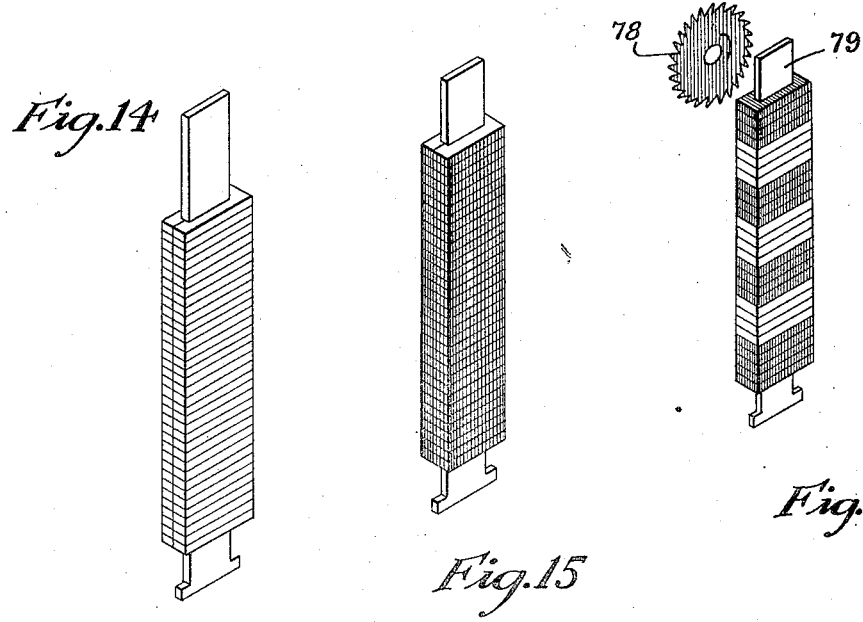
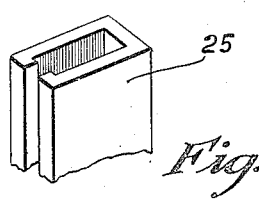
Inventor
Joseph A. Payette
By Howard E. Barlow
Attorney Patented Feb. 20, 1923.

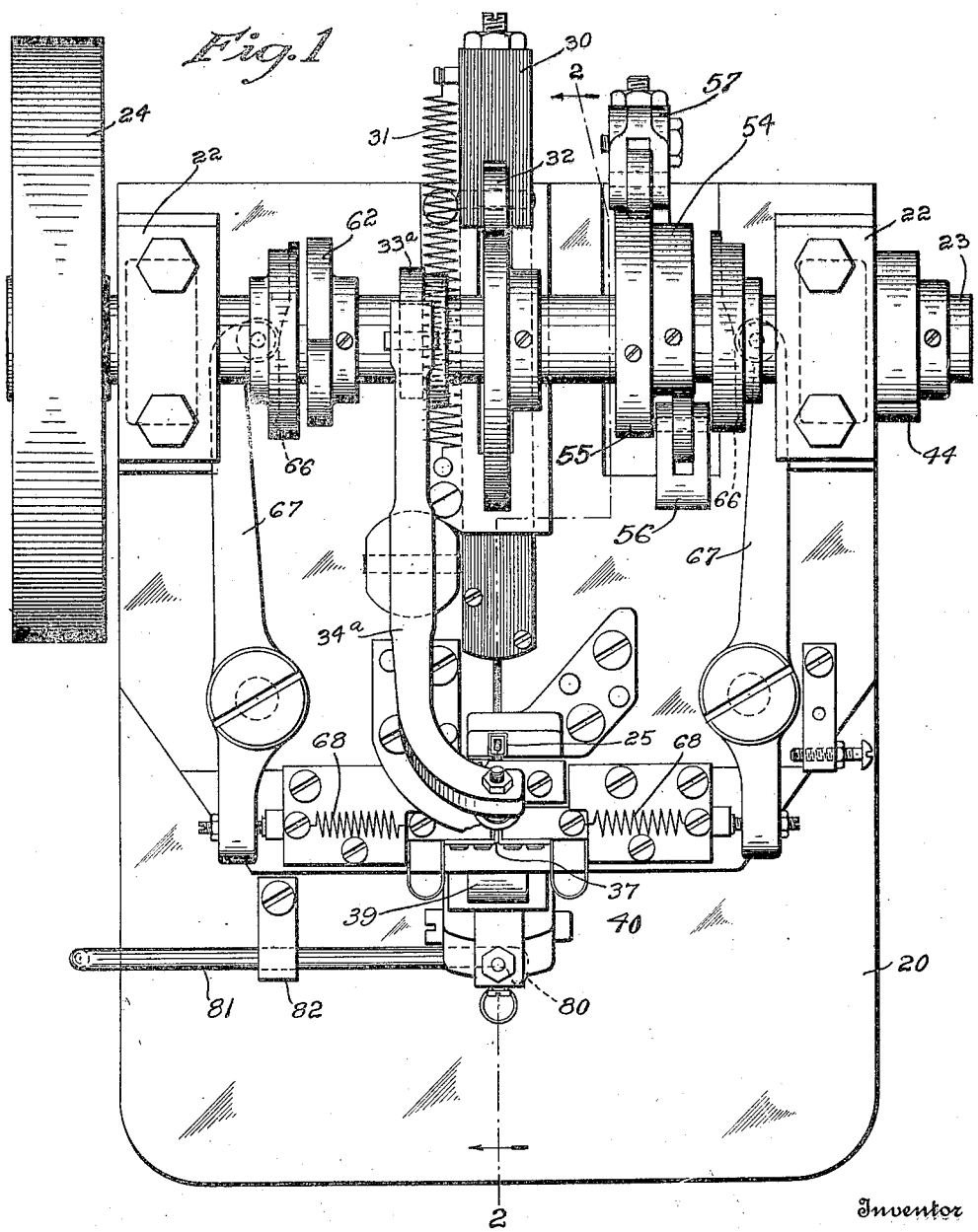

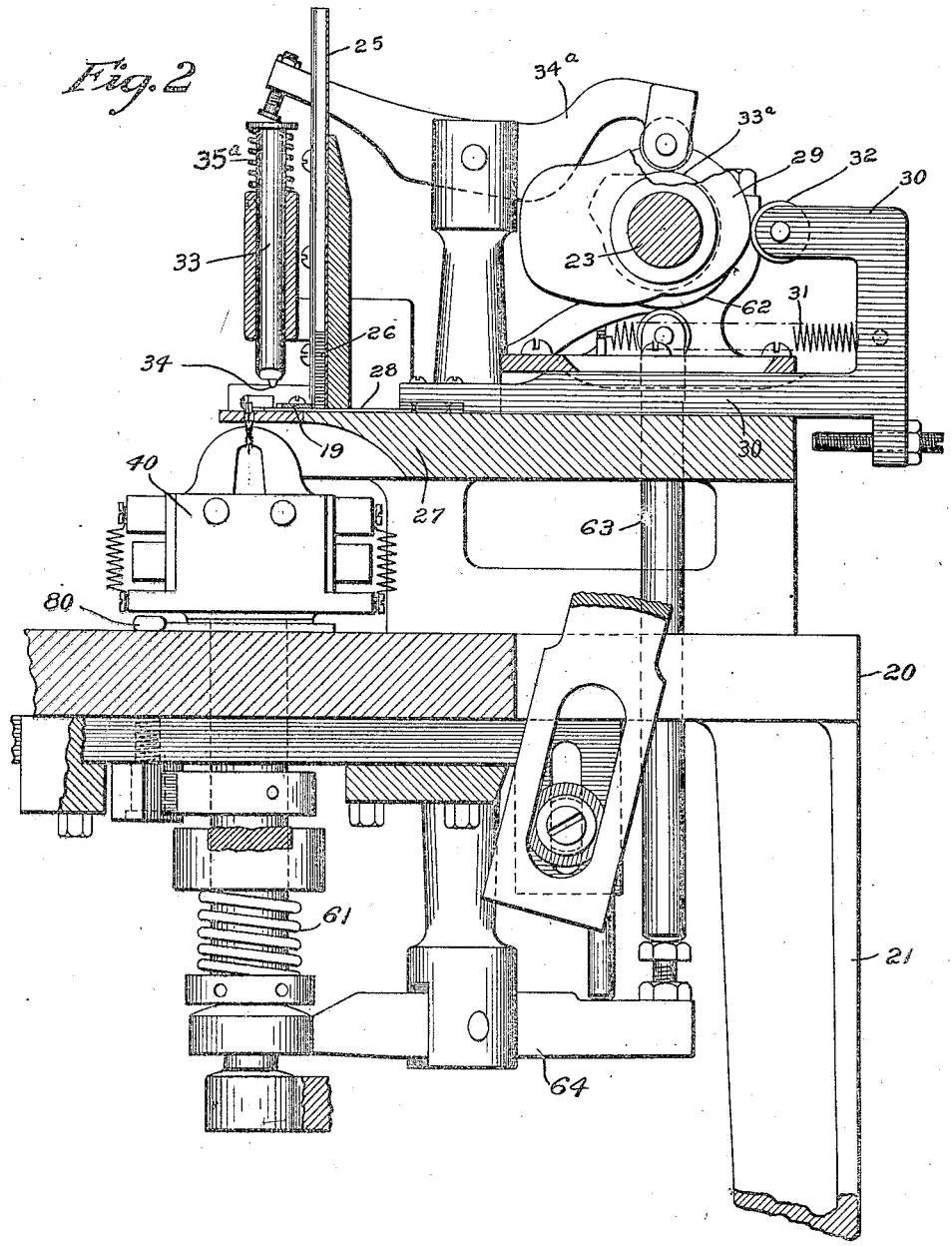

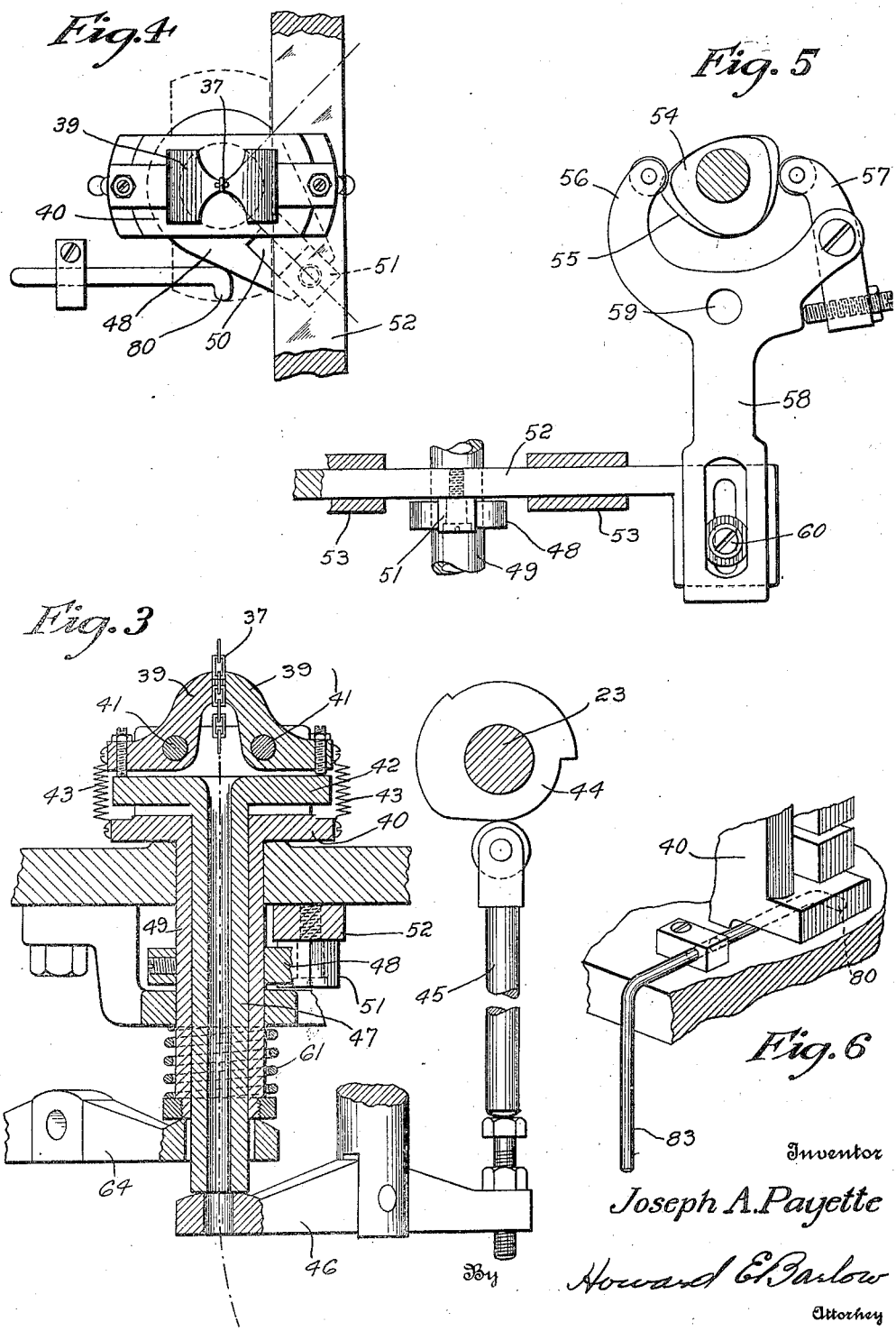

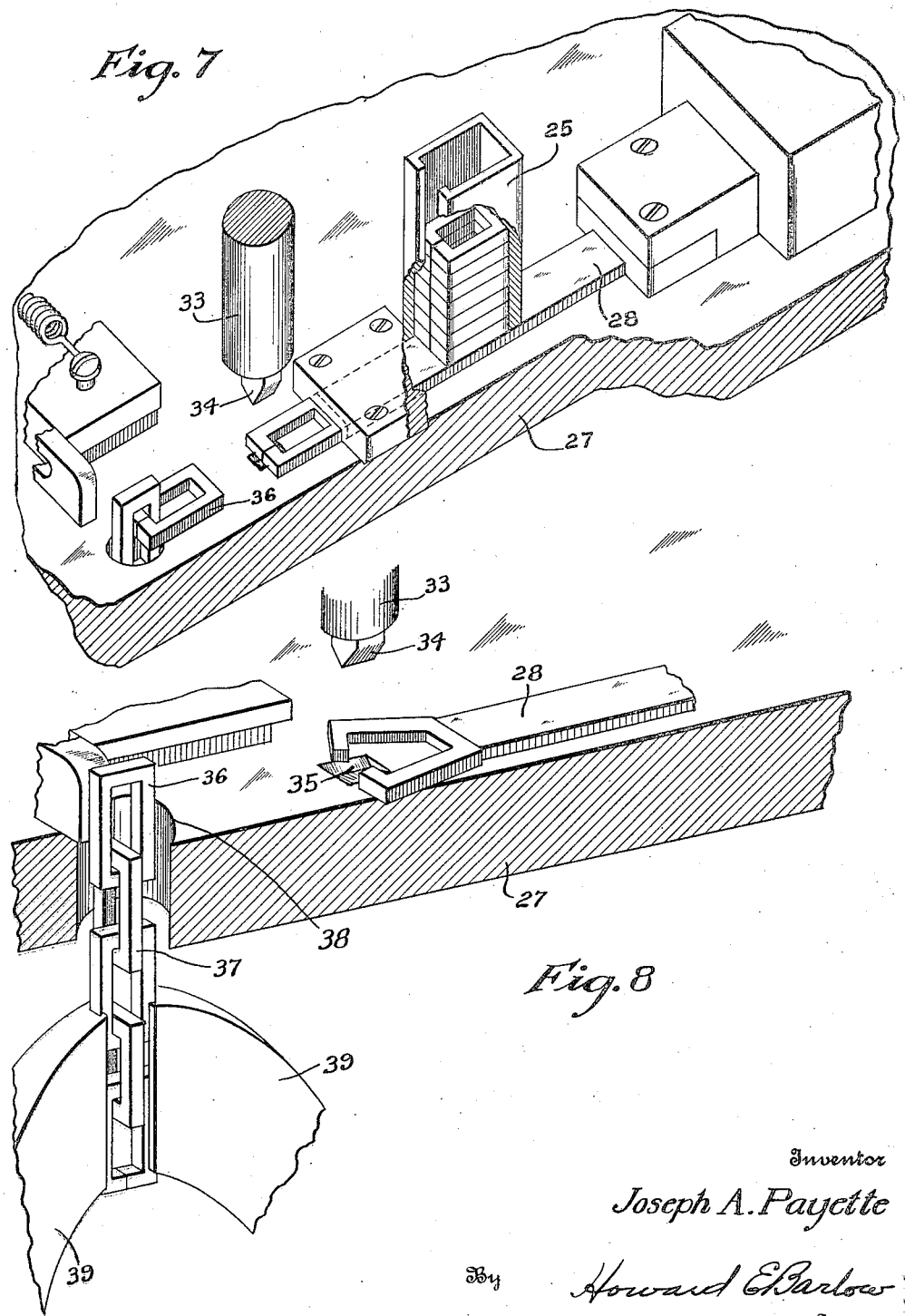

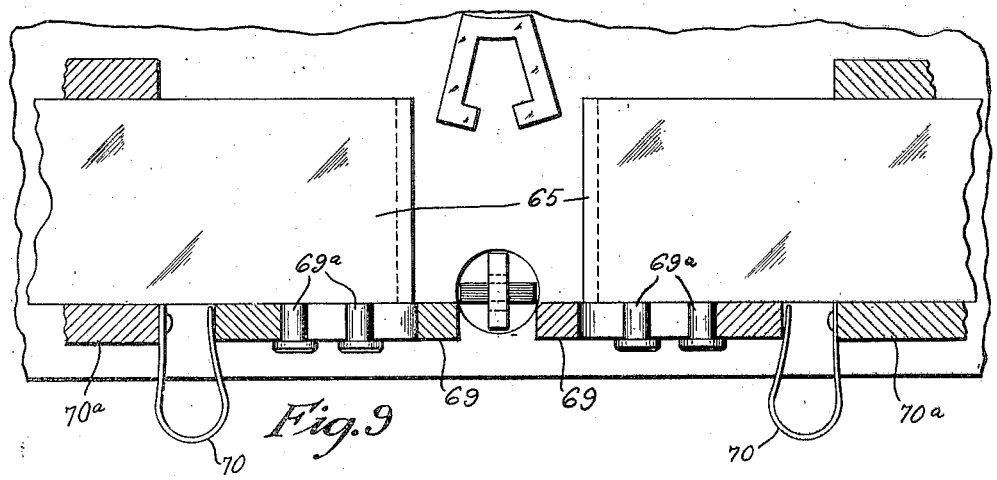
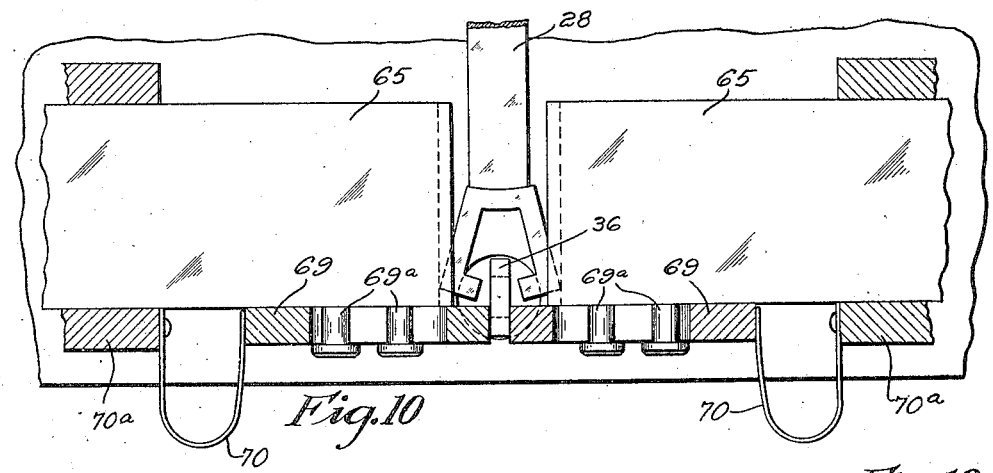
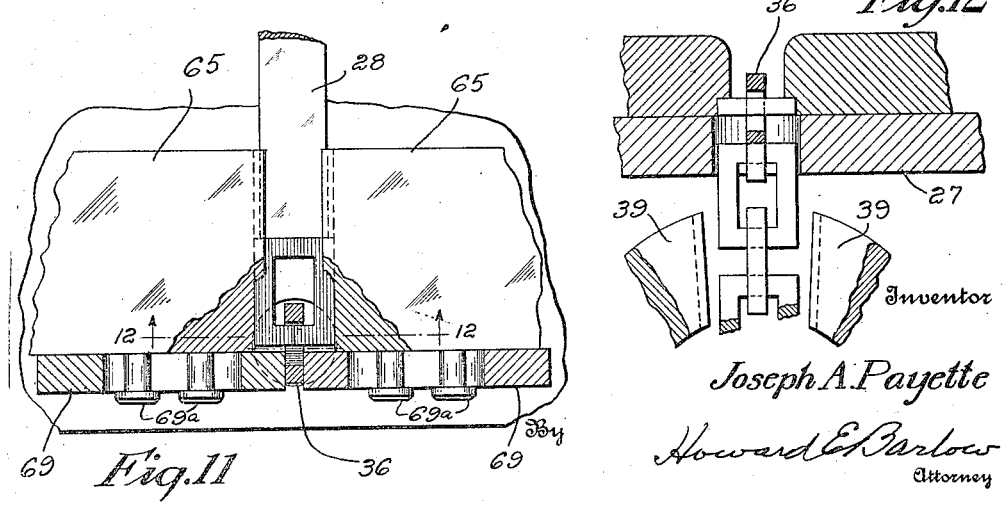

1,446,207

UNITED STATES PATENT OFFICE.

JOSEPH A. PAYETTE, OF ATTLEBORO, MASSACHUSETETS, ASSIGNOR TO S. O. BIGNEY & COMPANY, OF ATTLEBORO, MASSACHUSETTS, A CORPORATION OF MASSACHUSETTS.

MACHINE FOR AND METHOD OF MAKING CHAIN.

Application filed September 7, 1921. Serial No. 499,021.

*To all whom it may concern:*

Be it known that I, JOSEPH A. PAYETTE, a citizen of the United States, residing at Attleboro, in the county of Bristol and State of Massachusetts, have invented certain new and useful Improvements in Machines for and Methods of Making Chain, of which the following is a specification.

This invention relates to machines for and methods of automatically making chain of the class more particularly adapted for personal wear, and the object of this invention is to provide such a machine which is adapted to continuously and automatically make chain from links previously formed and carried in a magazine, means being provided for selecting a link from the magazine and connecting it to links of the chain previously formed.

A further object of this invention is to provide an improved method of forming the links and connecting them together, which is that of providing a ribbon or strip of flat stock from which link lengths are cut, punched and subsequently deposited in a magazine; the loaded magazine is now positioned in the chain machine which automatically selects a link at a time and connects it to a link in the chain previously formed.

With these and other objects in view, the invention consists of certain novel features of construction, as will be more fully described, and particularly pointed out in the appended claims.

In the accompanying drawings:

Figure 1 is a plan view of my improved chain machine.

Figure 2 is a side elevation sectioned on line 2—2 of Figure 1.

Figure 3 is a sectional elevation through the chain-gripping jaws and the mechanism for operating same.

Figure 4 is a top view of the mechanism shown in Figure 3.

Figure 5 is a detail illustrating the jaw rotating mechanism.

Figure 6 is a detail showing the hand operated cam for lifting the vise to open the jaws to facilitate positioning the chain therein.

Figure 7 is a perspective view showing the magazine, the means for selecting and advancing a link therefrom and the link-splitting or opening plunger.

Figure 8 is a perspective view showing the feeding link as having been split or opened and the chain positioned to permit this link to be connected thereto.

Figure 9 is a top view showing the link-closing jaws and the auxiliary link-gripping jaws in their separated position, also showing the fresh split link as lying on a table or support ready to be advanced into the chain engaging position.

Figure 10 shows both sets of jaws as having advanced, the auxiliary jaws as having gripped the last link in the chain, and the closing jaws in position to close the split link into the eye of the last chain link.

Figure 11 shows the fresh link as having been closed and connected to the last link of the chain.

Figure 12 is a sectional elevation on line 12—12 in Figure 11 showing the overlapping edges of the closing jaws which serve as guides for locating the fresh link into position to engage the last link of the chain.

Figure 13 is a perspective view illustrating the strip of link material as being punched and cut into link lengths and deposited into a magazine.

Figure 14 illustrates one set of links as formed from a strip of gold or metal of a certain color and mounted on a central wire or arbor.

Figure 15 is the same as Figure 14 but representing the links as formed of a different metal or color such as silver or the like.

Figure 16 illustrates a central core or wire on which a plurality of sets of links of different colors are alternately mounted to produce a chain of variegated colors; also a saw is shown as positioned to split the links as the whole is moved past the same.

Figure 17 shows a portion of a magazine into which the links of the same or variegated colors may be deposited and presented to the machine to be made into chain.

By my construction of chain machine and improved method of forming the links, I am enabled to blank out the links from a ribbon of flat stock by punching a hole therein and cutting link lengths from the ribbon, deposit these links in a magazine, feed them from the magazine, split and open the link at one point and connect the links at the split portion to links of the chain previously formed, and the following is a detailed description of one means by which this result may be accomplished:—

With reference to the drawings, 20 designates the bed of the machine on which all of the mechanism is supported, the bed being mounted on legs 21. On this bed are two main bearings 22 in which the cam shaft 23 is rotatably mounted, this shaft being driven from the pulley 24.

The links 26 as formed from sheet stock, as hereinafter described, are deposited in a tubular magazine 25, which after being filled may be positioned in the machine so that the lowermost link therein will rest upon its table 27. On this table is mounted an endwise reciprocating link feed finger 28, which is controlled in its action by cam 29, through the slide bar 30, which bar is drawn forward by the tension spring 31, to cause the roll 32 to rest against the edge of said cam 29, so that the finger is caused to move forward at the proper time and engage the lowermost link in the magazine and carry it forward through the guide 19, into the position illustrated in Figure 7, to be split and spread by the tool 34, at the next downward stroke of the plunger 33, which plunger is actuated by the cam 33ª through lever 34ª, whereby one side of this link is split and opened up into the position illustrated at 35 in Figure 8. This plunger now recedes under action of spring 35ª and the link thus opened is carried forward by a further forward movement of the feed finger 28 into position to be closed into the last previous link 36 formed in the chain 37.

This finger 28 is of substantially the same thickness as that of the links so that as it passes forward beneath the magazine, it engages only the lowermost link, carrying the same out from under the magazine, and at the same time this finger serves to support the rest of the links in the magazine during its forward stroke and until it is withdrawn from beneath the magazine, at which time the remaining links therein fall by their own gravity carrying the next lowermost link into position to be engaged by the next forward stroke of this feeding finger.

After each link has been split, opened up and connected to that portion of the chain previously formed, the chain must be moved by suitable means to move that link just connected thereto into position to receive the next following link. One means of moving the chain to position the last link connected will now be described, but I do not wish to be restricted to this particular means for so positioning the chain and link, as other suitable means may be employed for this purpose.

In this particular case I have formed a hole or opening 38, through the table 27, through which the chain 37 is fed vertically as formed, that portion of the chain below the table being gripped by a pair of jaws 39, mounted in a rotatable head 40, which jaws are pivoted at 41 in the head and are caused to be closed upon the chain links by action of the cam 44, through the connection 45, rocker arm 46, and hollow stem 47, to move the T head 42 against the tension of springs 43, and so tip the gripping ends of the jaws inwardly upon the chain.

When this cam 44 is moved to another definite position, the jaws under action of their springs 43 are permitted to open and release the chain, at which time the whole head is rotated back a quarter of a turn into position to again grip and hold the chain in position to permit the next link to be attached thereto.

The rotation of this head is accomplished by mounting a yoke member 48 on the outer tubular stem 49 of the jaw head 40 and in the slotted portion 50 of this yoke is mounted a sliding block 51, which block is connected to the reciprocating bar 52. This bar is mounted to slide endways in suitable bearings 53, and is actuated in both directions by the two cams 54 and 55, through the arms 56 and 57 respectively of the rocker member 58, which is pivoted at 59, the lower end of which rocker member is connected to this slide bar 52, at the point 60.

At the time the fresh link is being advanced from the magazine, and split, the gripping jaws 39 beneath the table 27, which are at this time closed upon the chain, are caused to drop sufficiently, under action of spring 61, which movement is controlled by the cam 62, through the connection 63, and rocker arm 64, to tip the link 36 (see Figure 7) which is now laying upon the table 27 upward into the position illustrated in Figure 8, and simultaneously with this dropping motion the jaw head is rotated 90 degrees to present this link 37 edgewise to the next advancing link. The link-closing jaws 65 are now moved inward towards each other under action of the cams 66, through the pivoted levers 67, against the tension springs 68, into the position illustrated in Figure 10, in which position they serve as a guide for the advancing opened ended link.

On the front edge of each of the link-closing jaws is slidably mounted an auxiliary link-locating jaw 69, each of which is pressed on its bearing pins 69ª by a U shaped spring 70, one end of which spring rests against the fixed guide 70ª, whereby the first inward motion of the closing jaws causes these locating jaws to engage the partially upturned link to complete the lifting and straightening of the same into position to receive the next link, as illustrated in Figure 10. The closing jaws while in this position serve as guides for the advancing link and a further inward movement of the link-closing jaws 65 now closes and locks the open link into the last link 36 of the chain, as illustrated in Figures 11 and 12. During this link closing action the chain-gripping jaws 39 beneath the table are opened by the mechanism above described and the head is rotated back 90 degrees and simultaneously raised to its normal position to again grip the chain ready to perform another cycle of operation.

To first position the chain between the jaws of the rotating head in starting the machine, it is found of advantage to provide means for readily opening these jaws by hand, and to accomplish this I have provided a cam 80, located beneath this head 40, which cam is attached to the end of the lever rod 81, mounted to rotate in the bearing 82 on the bed of the machine. The end of this cam lever extends downward as at 83 over the side of the bed whereby it may be readily swung forward by hand of the operator to cause the cam end 80 to turn and raise the head, which action as above described opens the jaws, thereby permitting the chain to be readily positioned therein when desired.

My improved method of and machine for forming a chain of the character described is as follows:

The stock from which I form my links is preferably in flat or ribbon form, as illustrated at 72 in Figure 13. This ribbon is fed by any suitable means against a stop 80, beneath a punching and cutting die 73, in which the punch 74 first forms spaced apart holes 75 in the ribbon, the punchings being carried away through the chute 76, and as the cutting die 77 descends it cuts off the punched end of the ribbon the length of a link, dropping the same into a magazine 25. The magazine as filled may be positioned directly in the machine to supply the links to be formed thereby into a chain.

In some cases it is desired to form chains of links of different colors of material such, for instance, as a predetermined number of alternate gold and silver links, in which case one magazine will be filled with gold links formed from a ribbon of gold, while another magazine will be filled with links formed from a strip of silver, after which these links may be removed from their respective magazines each on a wire core, as illustrated in Figures 14 and 15. Then a predetermined number of links may be taken from each core alternately and deposited on a third core, as illustrated in Figure 16, and these links thus arranged may then be deposited in a magazine to be fed to the machine to produce a chain of variegated colors.

In some instances I split the links in the chain forming machine by the splitting member 34, in the plunger 33, while in some other instances it is found to be of advantage to pass a saw 78 through one side of the links while strung on the arbor or core 79, so that when later presented to the splitting member 34, the latter will be called upon only to act as a spreader for the purpose of opening the previously severed link.

The chain 37 as previously described is now rotated 90 degrees after the attaching of each link, at the same time that the head is rotated the chain-gripping jaws 39 are caused to move downwardly a short distance simultaneously drawing the chain downwardly through the opening 38 in the table, causing the last link 36 to stand upright in this opening, this link being assisted into this upright position by the sidewise pressing action of the auxiliary locating jaws 69. The fresh link is now advanced into position to engage this last connected link 36 and is closed by a further closing action of the link-closing jaws 65. the chain-gripping head during this period is caused to return automatically to its original engaging position, the feeding finger 28 is drawn back from under the magazine and the whole mechanism is in a position to again repeat its above described cycle of operation to attach another link one at a time to the chain.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. In a chain machine, a magazine carrying links previously formed, means for selecting and advancing a link from said magazine, means for opening one side of the link and means for closing said opened link into a link of chain previously formed.

2. In a chain machine, a magazine carrying links previously formed, means for selecting and advancing a link from said magazine, means for opening one side of the link, means for adjusting the chain to position one of its links to receive the next, and means for closing said opened link into the said positioned link.

3. In a chain machine, a magazine carrying links previously formed, a support, mean for selecting a link from said magazine and advancing it on said support, means for opening one side of the link, means for rotating the chain previously formed to position the last link to receive the next, and means for positioning and closing said opened link into the positioned link of the chain.

4. In a chain machine, a magazine carrying links previously formed, a support having an opening through which the chain is fed as formed, means for selecting a link from said magazine and advancing it on said support, means for opening one side of the link, means for rotating and lowering the chain in said opening to position the last link to receive the next and means for positioning and closing said opened link into the last link of the chain.

5. In a chain machine, a magazine carrying links formed of flat stock, means for advancing a link from said magazine, means for cutting and opening the link, means for rotating the chain as formed to position the last link to receive the next and means for closing said opened link into the positioned link of the chain.

6. In a chain machine, a magazine carrying links previously formed, means for selecting and advancing a link from said magazine, means for opening the link to be attached, a pair of auxiliary jaws for supporting the chain link in position to receive the next, and a pair of bending jaws for closing the new link into the previously formed chain link.

7. In a chain machine, a magazine carrying links previously formed, means for selecting and advancing a link from said magazine, means for opening the link to be attached, a pair of auxiliary jaws for supporting the chain link to receive the next, a pair of bending jaws for closing the new link into the previously formed chain link, said bending jaws having means for guiding the new link as fed to the chain link.

8. In a chain machine, a magazine carrying links previously formed, means for selecting and advancing a link from said magazine, means for opening the link to be attached, a pair of auxiliary jaws for supporting the chain link to receive the next, a pair of bending jaws for closing the fed link into the previously formed chain link, and means for rotating the chain with its last link into position to receive the next when released by said jaws.

9. In a chain machine, a magazine carrying links previously formed, means for selecting and advancing a link from said magazine, a cam actuated reciprocating splitting member for spreading the walls of said link, said link being subsequently advanced into link engaging position, and bending jaws for closing said spread link into the last chain link.

10. An improved method of forming a chain, which consists in blanking links out of sheet stock by a punching and cutting operation, depositing the links so formed in a magazine, selecting a link from the magazine opening one side of the selected link and subsequently closing this opened side of the link into a link of the chain previously formed.

11. An improved method of forming a chain, which consists in punching spaced apart holes in a ribbon of sheet stock, cutting the stock into link lengths between the holes, depositing the links when cut into a magazine, feeding the links from the magazine, splitting and opening the link and subsequently closing the opened link into a link of the chain previously formed.

12. An improved method of forming a chain, which consists in punching and cutting link lengths from sheet stock, assembling the links, sawing open the end wall of the assembled links, feeding the links from the assembled mass, spreading the saw kerf and subsequently closing the opened link into a link of the chain previously formed.

13. An improved method of forming a chain, which consists in punching and cutting link lengths from sheet stock, having different characteristics, assembling links of the different characters in predetermined order in a single holder, feeding the different links in their prearranged order from the holder, splitting and spreading or opening each link and attaching the spread or opened links progressively each to the one previously connected to the chain, thereby producing a chain having links of different characteristics.

In testimony whereof I affix my signature.

JOSEPH A. PAYETTE.